Patented Jan. 17, 1928.

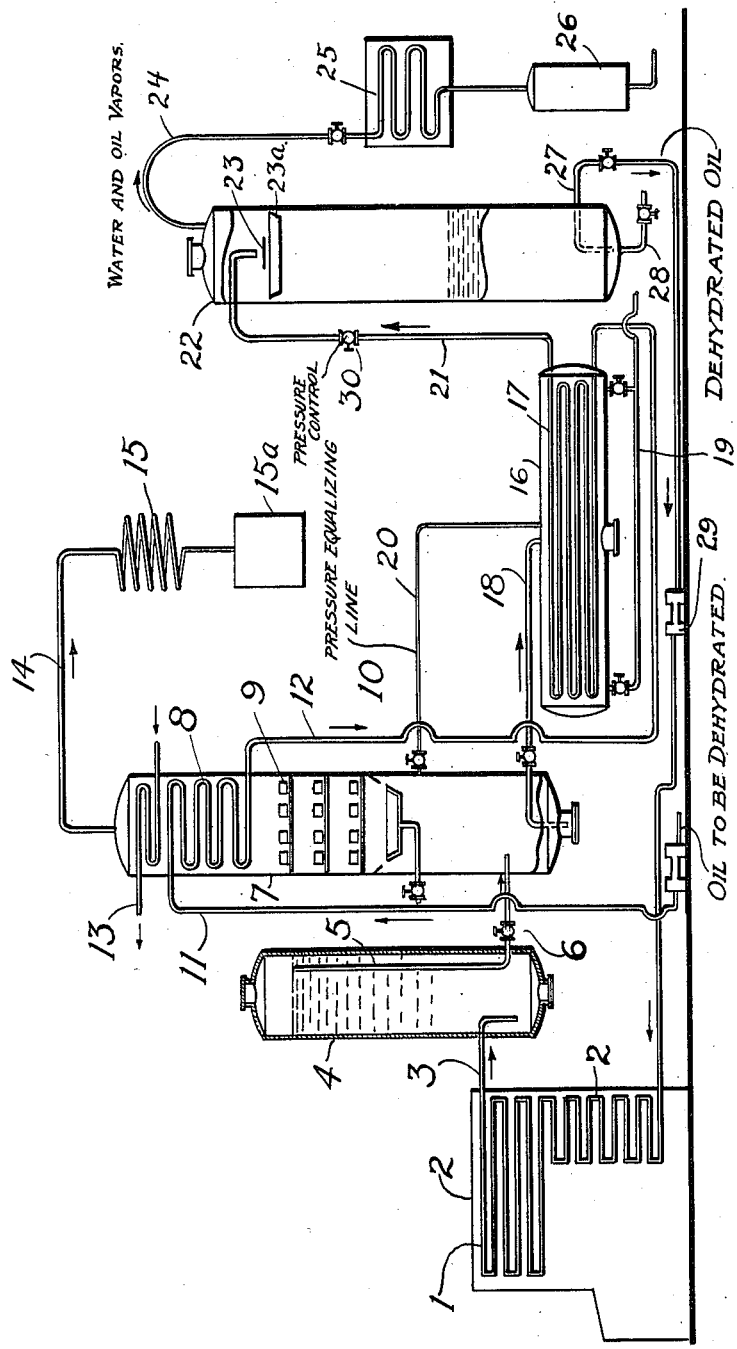

1,656,710

UNITED STATES PATENT OFFICE.

EDWARD A. RUDIGIER, OF BALTIMORE, MARYLAND, ASSIGNOR TO STANDARD OIL DEVELOPMENT COMPANY, A CORPORATION OF DELAWARE.

REFINING OILS.

Application filed March 12, 1925. Serial No. 14,898.

This invention relates to improvements in processes and apparatus for the dehydration and other refining or conversion (cracking) of oils, especially petroleum oils. The invention will be fully understood from the following description, taken in connection with the accompanying drawing, in which the single figure is a diagrammatic view in longitudinal section showing a preferred arrangement of apparatus.

Referring to the drawing, reference numeral 1 denotes a cracking coil arranged in a suitable furnace setting 2 and connected by a pipe 3 with a thermally insulated drum 4, in which conversion is caused by the contained heat of the oil. A pipe 5 leads from the upper portion of drum 4 through a pressure relief valve 6 to a vapor separating tower 7. A cooling coil 8, bell-cap plates 9 and condensate-receiving pan 10 are arranged in the tower. The cooling fluid used in the coil 8 is preferably the feed stock to be treated, which may be introduced through line 11 and discharged through line 12. An auxiliary water-cooled coil 13 may be provided also.

A vapor line 14 leads from the top of the tower 7 to a condenser 15 and receiving tank 15ª. The portion of the apparatus so far described does not constitute a part of the present invention, except in so far as it co-operates with other features referred to below. Instead of the coil and drum cracking system shown, any other suitable conversion apparatus may be used.

According to my invention, a heat exchanger 16 receives the oil to be treated, preferably after the oil has been heated by passing through coil 8 or in some other way. The oil flows through line 12 into the coil 17 of exchanger 16. The hot liquid residuum or tar from the vapor separating tower 7 is passed through line 18 into the shell of the exchanger, and after contact with the coil 17 is withdrawn through branched line 19 to a cooler (not shown). The tower 7 is preferably connected to the exchanger by a pressure equalizing line 20.

The heated feed stock is drawn off from the exchanger 16 through the line 21 to the upper portion of the dehydrating drum 22. Baffle plates 23 and 23ª are provided in the path of the entering oil to distribute it more or less. The baffle plate 23ª is shown as a shallow pan in which the oil collects and flows over at the edges. However, perforated plates or the like may be used. Vapors pass up around the rim of the pan or through the perforations.

The oil will be heated in the exchanger 16 to such a temperature that its water content will be substantially completely in the form of steam. It is ordinarily satisfactory to have the temperature of the oil entering the drum at about 375°F., though this may be varied. The pressure in the dehydrator may be about 20 lbs. per sq. in., but greater or less pressures may be used according to particular conditions. It is desirable to maintain the drum not more than half full of oil.

The drum 22 may be thermally insulated or heated to maintain or attain the desired temperature, if desired. Steam is taken off from the drum through line 24 leading to a condenser 25 and receiving tank 26. Ordinarily, light hydrocarbon vapors will accompany the steam. They may be recovered in any desired way. In operating upon crude oils such as Panuco crude, the dehydration treatment may be expected to remove about 3% of gasoline. However, the temperature and pressure conditions may be so selected as to remove substantially all the gasoline from high-gasoline crudes, coincident with the removal of water.

The dehydrated oil is drawn from the bottom of the drum 22 through line 27 and is passed to the cracking coil 1, or to other treating apparatus or storage. In dehydrating certain crudes, salts may be deposited in considerable amounts in the drum 22. Any such salts may be removed by means of the draw-off pipe 2₀.

Suitable valves are provided throughout the system, for example as indicated in the drawing, and pumps or other flow-producing means may be connected in circuit where necessary. In the installation shown, one pump 29 in the dehydrated oil line 27 is sufficient.

In case objectionable salt deposits are formed in the heat exchanger coil 17, a relatively high pressure may be maintained in the coil so as to prevent the vaporization of the water. Under these conditions the salts remain in solution and are carried forward to the drum 22. A pressure of 100 lbs. per sq. in. in the tubes may be used with good results. A pressure release valve 30 may be inserted in the line 21 to reduce the pressure on the oil-and-water stream before it enters the drum 22. Ordinarily it is unnecessary to maintain a high pressure in the coil 17, as any salts deposited in the return bends or elsewhere may be readily flushed out with water. The return bends may be provided with inlets to facilitate cleaning, the inlets being normally closed by plugs of suitable type.

A preferred embodiment of the invention has been illustrated and described, but it will be understood that numerous modifications may be made within the scope of the appended claims, in which it is my intention to claim all novelty inherent in the invention as broadly as the prior art permits.

I claim:

1. Apparatus for dehydrating and cracking oils, comprising a cracking coil, a thermally insulated conversion drum, means for passing oil from the coil to the conversion drum, a vapor separator connected to receive the product from the conversion drum, a heat exchanger receiving hot liquid from the vapor separator, a dehydrating drum, means for passing oil to be dehydrated through the heat exchanger and into the dehydrating drum, and means for passing oil from the dehydrating drum to the cracking coil.

2. Process of dehydrating and cracking oil, comprising heating the oil to a cracking temperature, passing the hot oil into an enlarged heat-insulated zone where conversion takes place, passing the fluid product from the conversion zone into a vapor-separating zone, taking off vapors therefrom, passing hot heavy residue from the lower portion of the vapor-separating zone into a heat exchange zone, passing the oil to be treated through said heat exchange zone, wherein it attains a temperature at which water vaporizes, thence passing the preheated oil into an enlarged dehydrating zone in which water vapor is evolved, withdrawing such water vapor, and forwarding the dehydrated oil to be raised to cracking temperature as aforesaid.

3. Process according to claim 2, in which the oil to be dehydrated is preheated under pressure, and this pressure is reduced before the oil enters the dehydrating zone.

EDWARD A. RUDIGIER.